May 12, 1942. R. EVERITT 2,282,324
GARAGE CONSTRUCTION
Filed Jan. 3, 1939
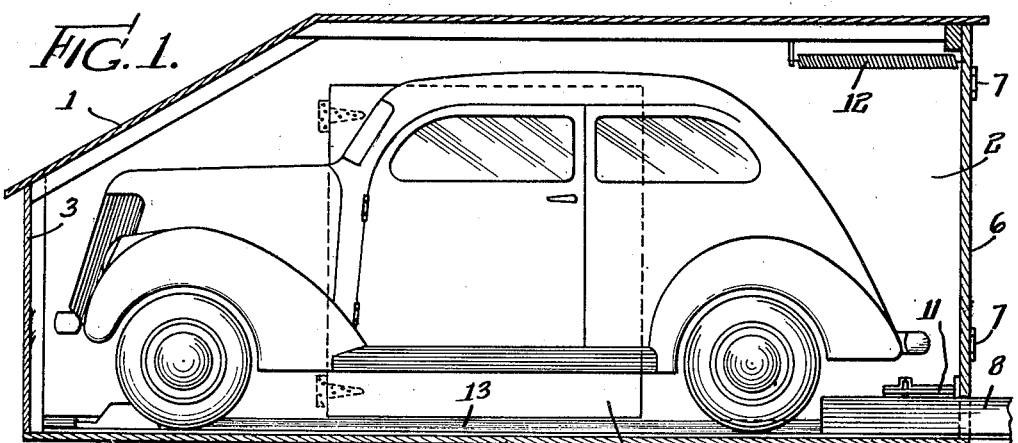
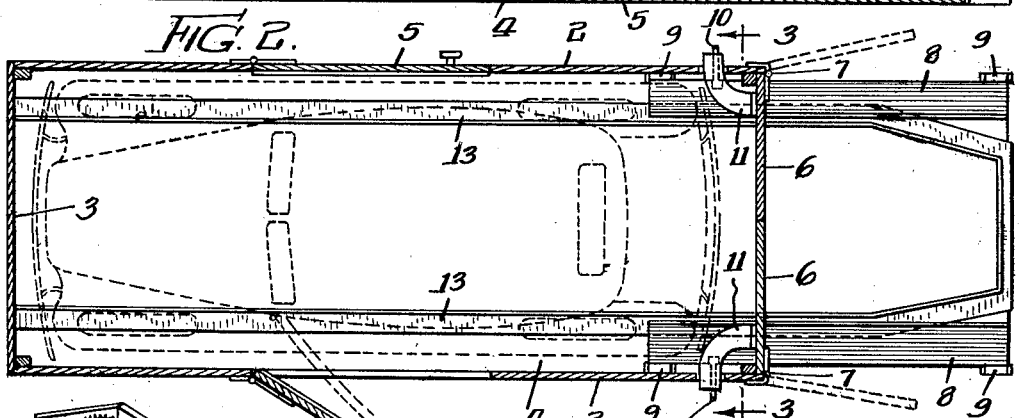
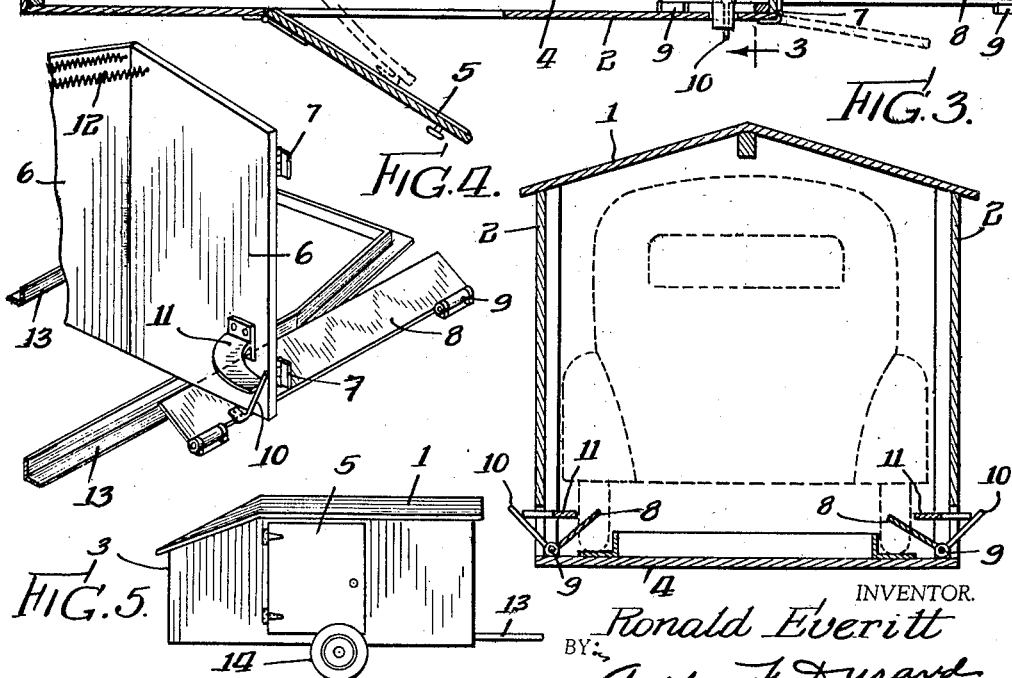
INVENTOR.
Ronald Everitt
BY Arthur H. Durand
ATTORNEY.

Patented May 12, 1942

2,282,324

UNITED STATES PATENT OFFICE 2,282,324

GARAGE CONSTRUCTION

Ronald Everitt, Aurora, Ill., assignor to Ronald Everitt and Vivian Everitt, Aurora, Ill., as joint tenants Application January 3, 1939, Serial No. 249,057

3 Claims. (Cl. 20—1.13)

This invention relates to garage construction, and more particularly to the doors thereof.

Generally stated, the object of the invention is to provide a novel and improved construction and arrangement whereby a motor vehicle may be housed in a garage that is only very little wider than the vehicle itself, provided with a side door which can be opened by the outward movement of the vehicle door, so that the driver or other occupant of the car may merely open the door of the latter and step down directly outside the garage, which latter can then be closed by simply closing the said door thereof, either with or without first closing the door of the vehicle.

It is also an object to provide a novel and improved construction whereby an automatic front door is provided for a garage, adapted to open automatically when the front wheels of the vehicle come within entering distance of the garage, and adapted to close automatically as soon as the car is entirely inside the garage.

It is also an object to provide certain novel details and features of construction and combinations tending to increase the general efficiency and the desirability of a motor vehicle garage construction of this particular character.

To the foregoing and other useful ends, the invention consists in matters hereinafter set forth and claimed and shown in the accompanying drawing, in which—

Fig. 1 is a longitudinal section of a garage construction embodying the principles of the invention, showing a motor vehicle enclosed therein.

Fig. 2 is a horizontal section of said garage construction.

Fig. 3 is a vertical transverse section on line 3—3 in Fig. 2 of the drawing.

Fig. 4 is a perspective showing the front door construction of the garage with certain portions shown broken away for convenience of illustration.

Fig. 5 is a side elevation of the said garage construction, on a smaller scale, showing the same mounted on wheels like a trailer.

As thus illustrated, the invention comprises a garage construction having a suitable roof 1 and side walls 2, together with a rear end wall 3 and a floor 4, of any suitable or desired character. As shown, the said side walls 2 are spaced apart a distance that leaves a clearance of perhaps not more than two or three inches, more or less, at the sides of the automobile or motor vehicle shown in the drawing. Consequently, when the driver has driven into the garage, and is ready to step out, the side door of the car could not ordinarily be opened, as it would impinge upon the side wall of the building structure.

Therefore, side doors 5 are provided, at opposite sides of the garage structure, opposite the side doors of the motor vehicle. Thus, when the driver opens the car door, the latter can be used to force the garage door outwardly, at either side of the vehicle, means being provided on the inner side of the garage door to prevent injury to the handle or other portions of the vehicle door. It is contemplated that only the driver would occupy the car, after the latter is driven into the garage, but it is obvious that the garage side doors could be made much wider, if necessary or desirable, in order to permit all of the passengers in the car to step out through the side doors of the garage. These garage doors can be made with spring hinges, or with other spring means to keep them normally closed, but they must not be locked when the car is driven into the garage, except as these doors might be provided with locks or latches of some kind that could be manipulated by the driver through an open window of the car. The garage door can be provided with any suitable or desired form of lock, of course, so that these doors can be locked and thereafter unlocked from the outside. But, in any event, it will be seen that side doors of this kind, adapted to be opened by the vehicle doors, make it possible to reduce the width of the garage to a minimum.

It will also be seen that the two front doors 6 are mounted to swing on hinges 7 at the front corners of the building, and are operated by the flat plates 8 that are hinged at 9 and provided with arms 10 that engage the ends of the arms 11 fixed on the inner sides of these doors. The latter are held normally in closed position, yieldingly, by the springs 12 or other equivalent means. Parallel guides 13 are provided, extending longitudinally of the floor of the garage, and tapered or converged together at their outer ends, as shown more clearly in Fig. 2 of the drawing, in order to guide and center the motor vehicle within the building.

With the foregoing construction and arrangement, the motor vehicle is driven up in front of the garage building, and as soon as the front wheels of the vehicle engage the plates 8, the latter will move downwardly and thereby open the doors 6, as shown in dotted lines in Fig. 2 of the drawing, so that they will swing outwardly into the positions shown in dotted lines in Fig. 2 of the drawing, it being understood that the parts should be relatively formed to insure this mode of operation. The driver will then drive the car forward, with the wheels of the vehicle at opposite sides of the guides 13 previously mentioned, so that the sides of the car will not scrape the sides of the building. As soon as the rear wheels of the vehicle disengage the plates 8, the springs 12 on the doors will return these plates to normal or raised position, as shown in Figs. 3 and 4 of the drawing, and the doors 6 will thereby be caused to automatically close. The driver will then open the side door of the vehicle, and this door will push one of the side doors of the garage outwardly, and the driver will then step down outside the garage building. The side door of the garage can then be closed and locked, and the front door 6 can also then be locked, by providing the doors with suitable locks for that purpose. Thereafter, when it is desired to enter the garage, in order to enter the car, the doors 6 will be unlocked, and also the side door of the garage through which the driver intends to enter the car. When the side door of the car is closed, the side door of the garage will be automatically closed, by its spring hinges or other equivalent means, and the driver will then back the car out of the garage, the rear wheels again engaging the plates 8 to automatically open the doors 6, and at about the time the rear wheels clear the plates 6, the front wheels will engage these plates to hold them down and keep the doors 6 open until the vehicle is entirely outside the garage. Then, as soon as the front wheels of the vehicle have disengaged the plates 8, the springs 12 or other equivalent means will then again automatically close these front doors, and thus restore the plates 8 to their normal or tilted position. With the car thus out of the garage, the latter is in readiness for the return of the car or motor vehicle, and the opening and closing of the doors of the garage, in the manner described.

Of course, by shaping the roof of the garage accordingly, the car can either be backed into the garage, or driven straight ahead therein, in the manner shown and described, for the opening and closing means for the doors 6 will work either way. As shown, of course, the vehicle doors are hinged at their forward edges, whereas in some cars the doors are hinged at their rear edges, and it will be understood that the side doors of the garage can be hinged at either edge, and that they can be made and shaped in a manner to operate with either type of vehicle door, or with either method of putting the car in the garage. As shown in the drawing, it is likely that less friction would occur between the vehicle doors and the side doors of the garage, if the car is driven forward into the garage, than would be the case if it were put in backward. But the construction can be changed or varied, more or less, depending upon the character of the motor vehicle, without departing from the spirit of the invention.

With the construction shown and described, in which the doors 6 swing outwardly and inwardly above the upper edges of the guides 13, it will be seen that some provision can be made for closing the space below the lower edges of these doors, when they are in closed position. A board or cross-piece between the guides 13, in the vertical plane of the doors, when the latter are in closed position, can be used for this purpose, and at the outer sides of these guides flaps can be provided on the lower edges of the doors, and various expedients of this kind can be employed for closing the space below the lower edges of said doors.

As shown in Fig. 5 of the drawing, the garage thus provided and constructed can be provided with wheels 14 so that it can be hitched to a motor vehicle and used as a trailer with a side door, or with two side doors, if desired, the converging or tapered outside extension of the guides 13 being available as a means for hitching the front end of the trailer to the rear end of a motor vehicle. These guides 13, of course, can be made of angle-iron, as shown, or they can be formed in any suitable or desired manner, but they should be strong and stiff enough to not only guide the wheels of the vehicle, but also to strengthen the floor of the structure and, as stated, provide the front hitching or draft means when the garage is used as a trailer.

Obviously, any suitable provision can be employed for removal of the wheels 14 when it is desired to support the garage on a solid foundation.

Thus it will be seen that the vehicle door becomes an adjunct of the garage to permit stepping into or out of the vehicle when the latter is in the garage, inasmuch as the vehicle door becomes an instrumentality for opening the garage door. In addition, this side door of the garage cannot be opened until after the automatic front door of the garage is closed, when the vehicle enters the garage.

It will be observed that the outside ends of guide 13 are deflected toward each other, making it less difficult to position the vehicle on said guides. In this way, the guides are partly inside the building and partly outside, and the same is true with the plates 8 that automatically operate the front door. Thus, with the construction shown and described, when the vehicle door is closed, nothing on the vehicle can scrape the side walls or the front doorway of the building, and the side door of the garage can be opened by the vehicle door while the vehicle is held in position by the parallel tracks or guides.

Looking at Fig. 1, it will be seen that stops can be provided to engage the front wheels of the vehicle to stop the latter accurately in correct position for the opening of the side door of the garage in the manner shown and described.

It is important to observe that with the provision of the guides 13 only a minimum of clearance is needed between the side of the vehicle and the side door of the garage. In fact, with the combination of these guides, and the side door of the garage, the latter can be of minimum width, and can be used as a trailer, on ordinary streets and roads. This is because the said walls of the garage can be of thin material which will not extend much beyond the sides of the vehicle, and hence the overall width of the garage can be practically the same as the overall width of the automobile.

What I claim as my invention is:

1. A garage unit adapted to be transported to various locations and having a side wall provided with a door that opens outwardly permitting the vehicle door to swing outwardly through the doorway of said garage door, a front passageway for the passage of the vehicle, a rigid guide means forming a frame portion across the bottom face of said unit and engaging the wheels of the vehicle to prevent injury to the side of the vehicle and the side wall of the garage, said rigid guide means extending through said front doorway a substantial distance in advance thereof and engaging all of the wheels of the vehicle when the latter is fully within the garage to prevent lateral displacement of the vehicle therein, said forwardly extending portions of the guide having means extending therebetween adapted to act as a draft connection when the device is transported, and means for attaching wheels to the unit.

2. A garage and trailer unit as defined in claim 1 wherein said forwardly extending portions of the guides converge in a forward direction.

3. A garage unit adapted to be transported to various locations and having a side wall provided with a door that opens outwardly permitting the vehicle door to swing outwardly through the doorway of said garage door, a front passageway for the passage of the vehicle, a rigid guide means forming a frame portion across the bottom face of said unit and engaging the wheels of the vehicle to prevent injury to the side of the vehicle and the side wall of the garage, said rigid guide means extending through said front doorway a substantial distance in advance thereof and engaging all of the wheels of the vehicle when the latter is fully within the garage to prevent lateral displacement of the vehicle therein, said forwardly extending portions of the guide serving to facilitate the centering of the vehicle with respect to the passageway and urging the wheels of the vehicle into operative engagement with treadle actuated door control means.

RONALD EVERITT.